(12) United States Patent
Ni et al.

(10) Patent No.: US 11,093,157 B2
(45) Date of Patent: Aug. 17, 2021

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Shuai Ni, Beijing (CN); Geng Han, Beijing (CN); Jian Gao, Beijing (CN); Xinlei Xu, Beijing (CN); Tianshu Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/887,204

(22) Filed: May 29, 2020

(65) Prior Publication Data

US 2021/0132847 A1    May 6, 2021

(30) Foreign Application Priority Data

Oct. 30, 2019  (CN) .......................... 201911048096.8

(51) Int. Cl.
 *G06F 3/06* (2006.01)
(52) U.S. Cl.
 CPC .......... *G06F 3/0647* (2013.01); *G06F 3/0617* (2013.01); *G06F 3/0619* (2013.01); *G06F 3/0653* (2013.01); *G06F 3/0659* (2013.01); *G06F 3/0689* (2013.01)

(58) Field of Classification Search
 None
 See application file for complete search history.

(56) References Cited

U.S. PATENT DOCUMENTS

| | | | |
|---|---|---|---|
| 8,082,390 B1 * | 12/2011 | Fan ..................... | G06F 11/1092 711/114 |
| 9,256,381 B1 * | 2/2016 | Fultz ..................... | G06F 3/0617 |
| 9,619,169 B1 * | 4/2017 | Throop ................. | G06F 3/0689 |
| 10,521,302 B1 * | 12/2019 | Gao ........................ | G06F 17/18 |
| 2008/0109601 A1 * | 5/2008 | Klemm ................. | G06F 3/0689 711/114 |
| 2017/0270018 A1 * | 9/2017 | Xiao ..................... | G06F 3/0617 |
| 2019/0129614 A1 * | 5/2019 | Dalmatov ............. | G06F 3/0619 |

* cited by examiner

*Primary Examiner* — Michael Alsip
(74) *Attorney, Agent, or Firm* — BainwoodHuang

(57) ABSTRACT

Techniques involve determining updated disk sets. The techniques further involve determining, from the updated disk sets, a target disk set for a storage unit associated with a plurality of storage disks. The techniques further involve determining position information of disk slices corresponding to the storage unit in the plurality of storage disks, in which the position information indicates respective updated disk sets in which the disk slices are located. The techniques further involve in accordance with a determination that an updated disk set indicated by position information of at least one of the disk slices is different from the target disk set, moving data in the at least one disk slice to the target disk set. Accordingly, an arrangement of a storage units across different disk sets can be avoided, and utilization rates of a plurality of storage disks can be made more uniform.

15 Claims, 7 Drawing Sheets

METHOD, ELECTRONIC DEVICE AND COMPUTER PROGRAM PRODUCT FOR STORAGE MANAGEMENT

CROSS-REFERENCE TO RELATED APPLICATION

This application claims priority to Chinese Patent Application No. CN201911048096.8, on file at the China National Intellectual Property Administration (CNIPA), having a filing date of Oct. 30, 2019, and having "METHOD, ELECTRONIC DEVICE AND COMPUTER PROGRAM PRODUCT FOR STORAGE MANAGEMENT" as a title, the contents and teachings of which are herein incorporated by reference in their entirety.

FIELD

Embodiments of the present disclosure generally relate to the field of data storage, and more specifically, to a method, an electronic device and a computer program product for storage management.

BACKGROUND

A disk array, such as redundant array of independent disks (RAID), is a disk group into which a plurality of independent disks are combined in a certain manner. For users, the redundant array of independent disks is like one disk, but it has a better storage capability than a single hard disk and can also provide data backup. When data in a disk area is damaged, the damaged data may be recovered with data backup, thereby ensuring security of user data. Storage units have structures and functionalities similar to the RAID, each of which corresponds to a plurality of disk slices on different storage disks.

However, when sets of storage disks are changed (for example, the number of disk sets is changed due to addition or reduction of storage disks), a plurality of disk slices corresponding to the same storage unit may be located in different disk sets, resulting in a reduction of the reliability of the storage system. In addition, there might be a large difference among each storage disk in the updated disk sets in terms of utilization rate, thereby causing the IOs conditions and wear conditions of the respective storage disks to be different and the storage space provided to users is restricted.

SUMMARY

The embodiments of the present disclosure provide a method, an electronic device and a computer program product for storage management.

According to a first aspect of the present disclosure, there is provided a method of storage management. The method includes in accordance with a determination that an original disk set including a plurality of storage disks is changed, determining a plurality of updated disk sets. The method also includes destination identification information associated with a second width for storing a destination stripe group of data. The method further includes determining, from the plurality of updated disk sets, a target disk set for a storage unit associated with the plurality of storage disks. Moreover, the method also includes determining position information of a plurality of disk slices corresponding to the storage unit in the plurality of storage disks, the position information indicating respective updated disk sets in which the plurality of disk slices are located. In addition, the method includes in accordance with a determination that an updated disk set indicated by position information of at least one of the plurality of disk slices is different from the target disk set, moving data in the at least one disk slice to the target disk set.

According to a second aspect of the present disclosure, there is provided an electronic device. The electronic device includes: a processor; and a memory storing computer program instructions, the processor executing the computer program instructions in the memory to control the electronic device to perform acts including: in accordance with a determination that an original disk set including a plurality of storage disks is changed, determining a plurality of updated disk sets; determining, from the plurality of updated disk sets, a target disk set for a storage unit associated with the plurality of storage disks; determining position information of a plurality of disk slices corresponding to the storage unit in the plurality of storage disks, the position information indicating respective updated disk sets in which the plurality of disk slices are located; and in accordance with a determination that an updated disk set indicated by position information of at least one of the plurality of disk slices is different from the target disk set, moving data in the at least one disk slice to the target disk set.

According to a third aspect of the present disclosure, there is provided a computer program product being tangibly stored on a non-transitory computer-readable medium and including machine-executable instructions which, when executed, cause a machine to perform steps of the method according to the first aspect of the present disclosure.

BRIEF DESCRIPTION OF THE DRAWINGS

The above and other objectives, features and advantages of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

Figure 1:
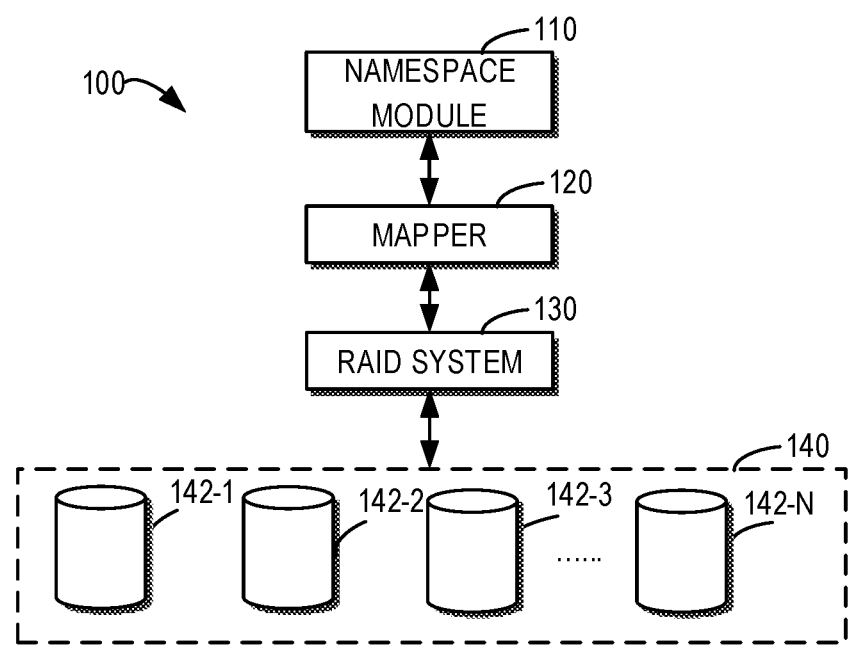
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will now be described in detail with reference to the accompanying drawings. Although the drawings illustrate some embodiments of the present disclosure, it would be appreciated that the present disclosure may be implemented in various forms but cannot be construed as being limited by the embodiments illustrated herein. Rather, these embodiments are provided to disclose the present disclosure more thoroughly and completely. It is to be understood that the drawings and embodiments of the present disclosure are provided merely as examples, rather than limiting the protection scope of the present disclosure.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an embodiment" and "the embodiment" are to be read as "at least one embodiment." The terms "first," "second," and the like may refer to different or the same objects. Other definitions, either explicit or implicit, may be included below.

Principles of the present disclosure will now be described with reference to several example embodiments illustrated in the drawings. Although the drawings illustrate preferred embodiments of the present disclosure, it would be appreciated that description of those embodiments is merely to enable those skilled in the art to better understand and further implement example embodiments disclosed herein and is not intended for limiting the scope disclosed herein in any manner.

In a RAID-based storage system, one RAID may include disk slices from a plurality of storage disks, and the plurality of storage disks may constitute a plurality of independent RAIDs. In a RAID-based data recovery process, data in a target disk slice may be recovered with other disk slices in the same RAID. In order to reduce risks resulting from storage disk failure as much as possible, for the RAID-based storage system, it is always expected to distribute disk slices in a plurality of RAIDs evenly into respective storage disks, to minimize the impact of a failed storage disk. However, when a storage system performs a garbage collection operation or when a new storage disk is added to a storage system, the distribution of disk slices of the plurality of RAIDs in the storage system may not be balanced. In order to better understand the process of storage management according to embodiments of the present disclosure, a basic architecture of the RAID-based storage system will be introduced below.

FIG. 1 illustrates a schematic diagram of an example storage system 100 in which embodiments of the present disclosure can be implemented. As shown in FIG. 1, the storage system 100 includes a hardware storage pool 140, which includes a plurality of storage disks 142-1, 142-2, 142-3 . . . 142-N (where N is an integer greater than or equal to 1), for providing a physical storage space of the storage system 100. For the purpose of discussion, these storage disks are sometimes referred to as storage disk 142 collectively or separately. The storage disk 142 may include various types of devices with a storage function, including, but not limited to, a hard disk (HDD), a solid-state disk (SSD), a removable disk, a compact disk (CD), a laser disk, an optical disk, a digital versatile disk (DVD), a floppy disk, a blu-ray disc, a small computer system interface (SCSI) storage disk (SAS), a serial advanced technology attachment (SATA) storage disk, any other magnetic storage devices and any other optical storage devices, or any combination thereof.

A RAID system 130 in the storage system 100 is built on a plurality of storage disks 142, to organize a physical storage space of storage disks 142 with a RAID algorithm. The RAID system 130 provides a flat physical address space for a mapper 120 of the storage space 100. The mapper 120 is configured to manage a mapping between a physical address and a logical address of the storage system 100. The mapper 120 provides a namespace module 110 with a flat linear logical address space. The namespace module 110 utilizes a logical address space provided by the mapper, and may invoke an application program interface (API) of the mapper 120 to obtain a mapping from a logical address to a physical address. When performing an I/O operation on the storage system 100, an I/O request from a user is received by the namespace module 110 and is sent to the mapper 120. The mapper 120 searches a physical address (the address to/from which data is written or read) of data for the I/O request, and initiates I/O to the RAID system 130, to make the RAID system 130 to perform a real I/O operation on backend storage disks.

It would be appreciated that FIG. 1 only schematically illustrates units, modules or components in the storage system 100 related to the embodiments of the present disclosure. Respective components as shown in FIG. 1 is merely an example storage system management architecture, and in other RAID-based storage system, there may be other architecture dividing manners for other units, modules, components, or the like, of other functions. Therefore, the embodiments of the present disclosure are not limited to the specific devices, units, modules or components as depicted in FIG. 1, but are generally appropriate for any RAID technology-based storage system.

Figure 2:
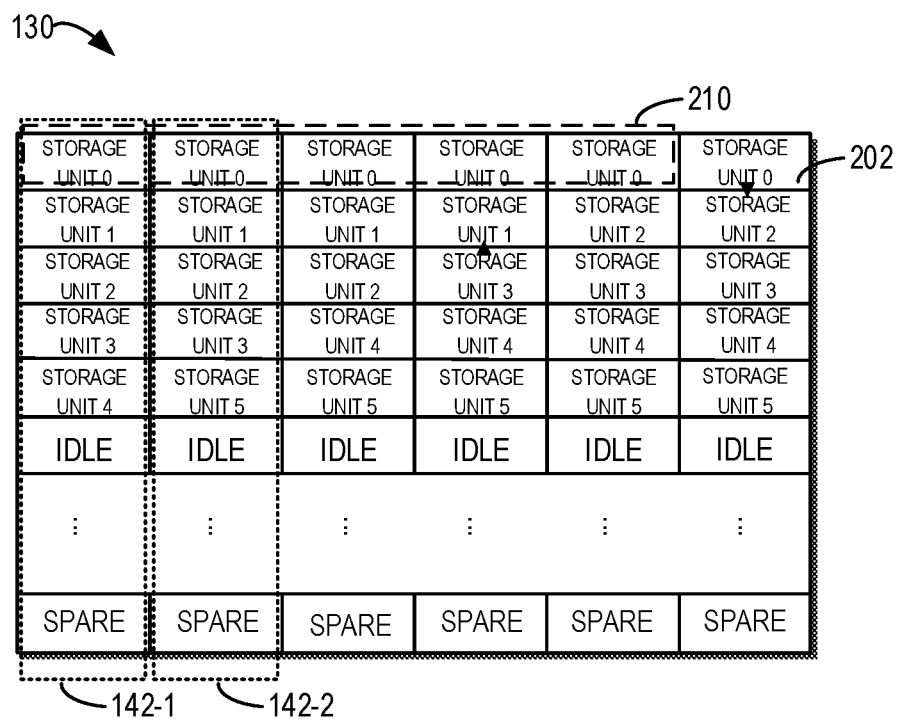
FIG. 2 illustrates a schematic diagram of a storage unit comprised of a plurality of disk slices from a plurality of storage disks according to embodiments of the present disclosure.

In a RAID-based or storage unit-based storage system, various RAID algorithms may be used to organize a physical storage disk 142, including a legacy RAID algorithm and architecture currently referred to as RAID 2.0. In order to better understand the RAID-based storage system, FIG. 2 illustrates an example structure of the RAID system 130. As shown in FIG. 2, the storage disk 142 is divided into a plurality of disk slices 202. This division may be a logical division. The size of the disk slice 202 is dependent on the size of the storage disk and division manner. In some examples, the size of the disk slice 202 may be at a gigabyte level. Of course, other sizes of the disk slice are also feasible according to actual deployment needs.

The RAID system 130 is built in units of the disk slices 202. In some dynamic distribution storage systems, when the RAID system 130 is built initially, all disk slices are idle.

When data is being written, the RAID system 130 will select a plurality of disk slices 202 from different storage disks 142 with a certain algorithm, and organizes those disk slices 202 into a storage unit 210 of the RAID system 130. This storage unit 210 may be regarded as a small RAID because I/O access and management of the storage unit 210 are similar to a conventional RAID.

The disk slices 202 may be selected from the plurality of storage disks 142 with any appropriate algorithm, such as a round-robin algorithm, a weighted polling distribution algorithm, and the like. The number of disk slices included in each RAID 210 is determined by the RAID type, to provide data redundancy and recovery at different levels. The types of RAID includes RAID 2, RAID 3, RAID 4, RAID 5, RAID 6, RAID 7, RAID 10, and the like. In FIG. 2, for the purpose of illustration, the RAID 5 for storing general data will be used for discussing the example embodiment of the present disclosure. However, it would be appreciated that the example embodiment of the present disclosure may be applied likewise to any other RAID type.

In FIG. 2, according to the RAID 5 type, each storage unit 210 includes five disk slices from different storage disks 142. As aforementioned, according to the data write needs, a new storage unit 210 may be allocated continuously such that the capacity of the RAID system 130 can be increased dynamically. FIG. 2 illustrates therein five storage units 210 allocated (i.e., storage units 0 to 5). In FIG. 2, the respective storage units to which the respective disk slice 202 is allocated are marked as "storage unit 0," "storage unit 1," "storage unit 2," "storage unit 3," "storage unit 4" or "storage unit 5." The disk slices 202 not selected as the storage units in the respective storage disks 142 are considered as idle disk slices 202, which are marked as "idle."

In some embodiments, one or more disks 202 may be spared in each storage disk 142, which are marked as "spare," for use in data rebuilding when disk failure occurs. For example, if one storage disk 142 fails, the disk slices 202 of the storage disk 142 are all marked as "failed," indicating that the storage units 210 built on the basis of these disk slices 202 are affected. The storage system 100 may start a rebuilding process in which the spared disk slices 202 are selected to replace the disk slices marked as "failed" in the storage unit 210, and data/information in the disk slices marked as "failed" are rebuilt into the spared disk slices 202. According to the rebuilding algorithm, the rebuilding process may be started within a period of time since disk failure. The scope of the present disclosure is by no means limited in the aspect.

Normally, a plurality of storage disks 142 in a hardware storage pool 140 are managed in a form of disk set. For example, the plurality of storage disks 142 in the hardware storage pool 140 are all grouped into one or more disk sets (e.g., RAID resilience sets (RRS)). As the storage disks 140 are increased or decreased, the disk sets need to be rearranged. At this time, the plurality of disk slices corresponding to the same storage unit may be located at different disk sets, causing the reliability of the storage system 100 to be reduced.

Figure 3:
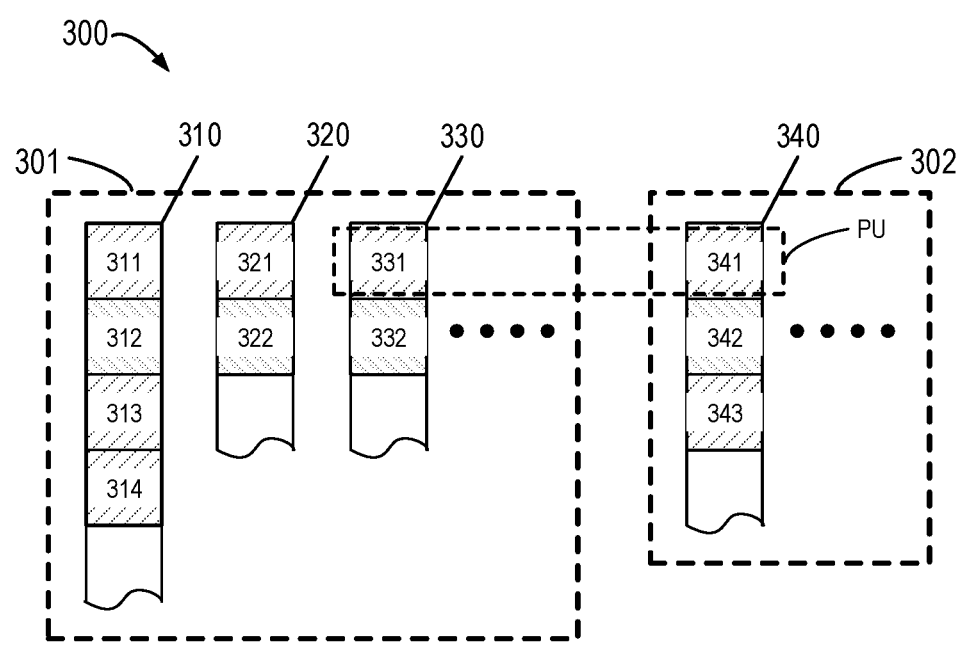
FIG. 3 illustrates a schematic diagram of an application scenario for storage management according to embodiments of the present disclosure.

For the purpose of understanding, FIG. 3 illustrates a schematic diagram of an application scenario 300 for storage management according to embodiments of the present disclosure. In FIG. 3, a storage disk 310 includes disk slices 311, 312, 313 and 314, a storage disk 320 includes disk slices 321 and 322, a storage disk 330 includes disk slices 331 and 332, and the storage disk 340 includes disk slices 341, 342 and 343. The storage disks 310, 320, 330 and 340 were located previously in the same disk set. Due to an increase (as indicated by the ellipsis) of the storage disks, the storage disks 310, 320, 330 and the storage disk 340 are arranged in a disk set 301 and a disk set 302, respectively.

It should be appreciated that, in order not to blur the conception of the present disclosure, the application scenario 300 illustrated by way of example in FIG. 3 only has a RAID 2 storage system for storing metadata. In other words, unlike the one in FIG. 2, the storage unit in FIG. 3 only includes two disk slices from different storage disks. As shown in FIG. 3, the storage unit (PU) corresponds to the disk slice 331 in the storage disk 330 and the disk slice 341 in the storage disk 340. However, since the original disk set is divided into the disk set 301 and the disk set 302, and the disk slice 331 and the disk slice 341 are respectively located in the disk set 301 and the disk set 302, the PU is arranged across different disk sets. This is undesirable.

In order to solve the above problem, the present disclosure provides a method of storage management. In this method, respective storage units are detected one by one to determine whether a plurality of disk slices corresponding to a storage unit are located in different disk sets. If the storage unit is arranged across disk sets, data in the disk slices corresponding to the storage unit are all moved to the same disk set. As such, the method can avoid the arrangement of a storage unit across different disk sets and thus improve the stability of the storage system. In addition, since the respective disk sets are rearranged, there is a big difference among utilization rates of a plurality of storage disks within the respective disk sets. "Utilization rate" refers to a proportion of a used space in a storage unit. As discussed above, uneven utilization rates may cause the IOs and the wear of the respective storage units to be different and restrict the storage space that can be provided to a user. By determining a threshold, data of disk slices in a disk exceeding the threshold may be moved to disk slices not reaching this threshold, thereby making the utilization rates of the plurality of storage disks more even.

Figure 4:
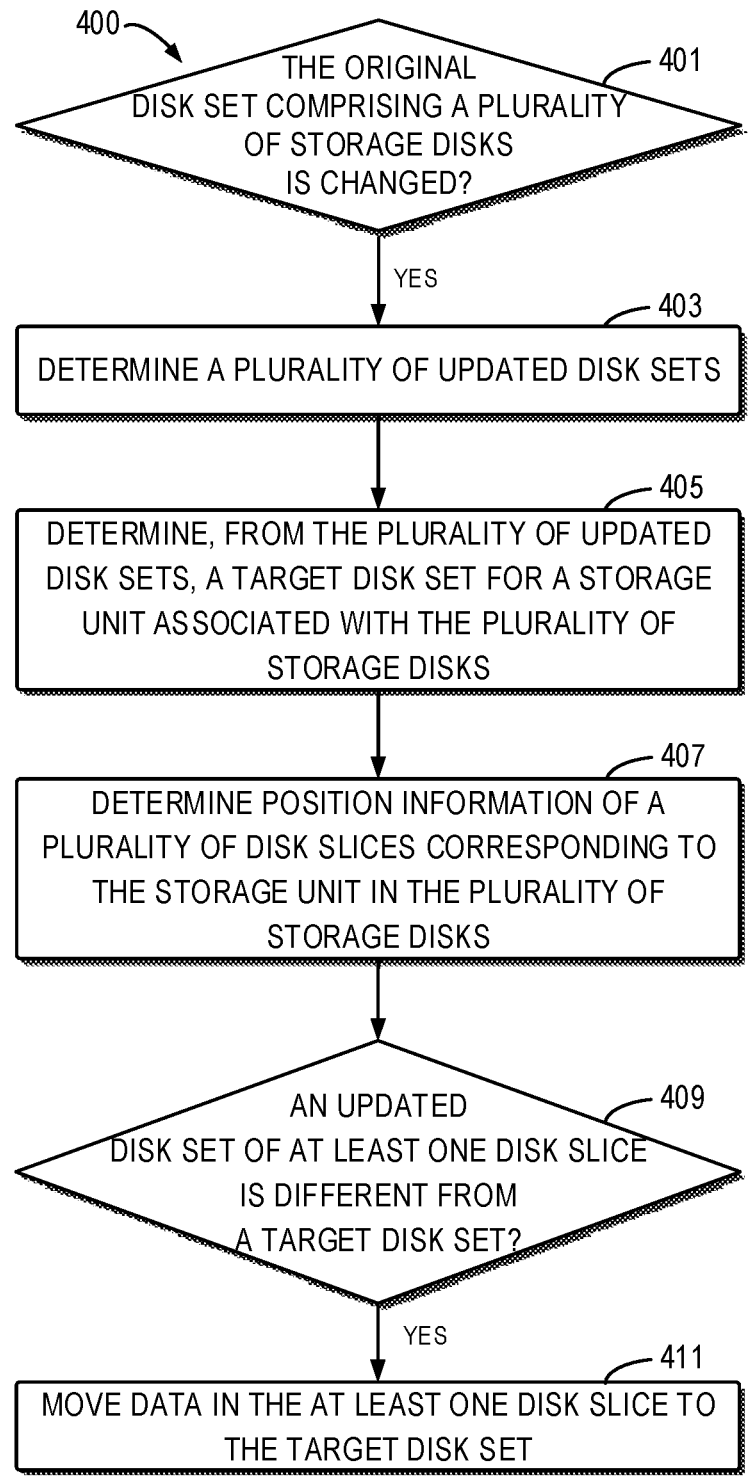
FIG. 4 illustrates a flowchart of a process of storage management according to embodiments of the present disclosure.

Implementations for storage management have been described with reference to FIGS. 1-3. The above examples are provided merely by way of example, rather than limiting the present disclosure. Reference will now be made to FIG. 4 to describe in detail a flowchart of a process of storage management.

FIG. 4 illustrates a flowchart of a process 400 of storage management according to embodiments of the present disclosure. In some embodiments, the process 400 may be performed by the RAID system 130 in FIG. 1. For example, the process 400 may be implemented in the application scenario 300 for managing storage disks 310, 320, 330 and 340 as shown in FIG. 3. Reference will now be made to FIG. 4 to describe the process of storage management according to embodiments of the present disclosure. For ease of understanding, the specific data as mentioned hereinafter are provided merely by way of example, and not used for limiting the protection scope of the present disclosure.

At 401, it is determined whether an original disk set including a plurality of storage disks 310, 320, 330 and 340 is changed. As shown in FIG. 3, it can be determined that the storage disks 310, 320, 330 and 340 have been divided to the disk sets 301 and 302, respectively, due to addition of a new storage disk. It would be appreciated that, in addition to an increase in disk sets resulting from addition of storage disks, the disk set change may include a reduction in disk sets caused by decrease of the storage disks, and migration of storage disks to different disk sets due to rearrangement of storage disks. When it is determined that the disk sets are changed, the process 400 proceeds to 403.

At 403, a plurality of updated disk sets may be determined. In some embodiments, if it is determined that the number of storage disks in the original disks set exceeds a predetermined disk number of the original disk set, then the original disk set may be determined as a plurality of updated disk sets. For example, an upper limit of storage disks in a legacy disk set is 25. If the number of the storage disks in the original disk set is expanded from 20 to 26 (exceeds 25), the original disk set may be divided into two updated disk sets. If the number of the storage disks of the original disk set is expanded from 20 to 56 (exceeds 50), the original disk set may be divided into three updated disk sets. If the number of the storage disks of the original disk set is reduced from 56 to 26, the original three disk sets may be merged into two updated disk sets. Since the disk set change probably involves a plurality of disk slices of a storage unit that are located across different disk sets, it is of great importance to detect the disk set change.

At 405, a target disk set of a storage unit associated with a plurality of storage disks may be determined from the plurality of updated disk sets. For example, as shown in FIG. 3, a target disk set of a storage unit (PU) associated with storage disks 330 and 340 may be determined from the updated disk sets 301 and 302. It would be appreciated that there may be several manners of determining a target disk set.

In some embodiments, a group of storage units associated with the storage unit (PU) may be determined, for example, the storage unit (PU), a storage unit corresponding to disk slices 311 and 321, and a storage unit corresponding to the disks slices 312 and 322. In the present storage unit-based system, every twelve storage units correspond to a virtual storage unit (Virtual Uber) or a virtual container (Virtual Container), the storage unit (PU), the storage unit corresponding to the disk slices 311 and 321, and the storage unit corresponding to the disk slices 312 and 322 therefore may all correspond to one virtual storage unit or virtual container, respectively. Subsequently, it may be determined that the number of storage units from the group of storage units (i.e., the storage unit (PU), the storage units corresponding to disk slices 311 and 321, and the storage units corresponding to the disk slices 312 and 322) located in an updated disk set in the updated disk set 301 and further in the updated disk set 302 exceeds a predetermined threshold.

In FIG. 3, the predetermined threshold may be set to 1. Since at least the storage units corresponding to the disk slices 311 and 321 and the storage units corresponding to the disk slices 312 and 322 are located in the updated disk set 301, the updated disk set 301 may be determined as the target disk set. Determining the target disk set in this way can reduce the count of data migration to the target disk set as many as possible.

In some embodiments, a disk set including a maximum number of storage units in the group may be determined as the target disk set. Alternatively or additionally, the original disk set (which may be the updated disk set 301) in which the group of storage units was located previously may be determined as the target disk set. In this way, the count of data movements may be reduced.

At 407, position information of a plurality of disk slices corresponding to the storage unit in the plurality of storage disks is determined. As shown in FIG. 3, the position information of the disk slices 331 and 341 corresponding to the storage unit (PU) in the storage disks 310, 320, 330 and 340 may be determined. The position information used herein may indicate respective updated disk sets where the disk slices 331 and 341 are located. In other words, the position information of the disk slice 331 may indicate that the disk slice 331 is located in the disk set 301, and the position information of the disk slice 341 may indicate that the disk slice 341 is located in the disk set 302.

In some embodiments, the storage disks where the disk slices 331 and 341 are located may be determined. For example, the disk slice 331 is located at the storage disk 330, and the disk slice 341 is located at the storage disk 340. Thereafter, it may be determined from the storage disk 330 that the storage disk 330 is located in the disk set 301, and it may be determined from the storage disk 340 that the storage disk 340 is located in the disk set 302, such that the position information of the disk slices 331 and 341 can be determined.

At 409, it may be determined whether the updated disk set indicated by position information of at least one disk slice in a plurality of disk slices is identical to the target disk set. As shown in FIG. 3, it may be determined whether the updated disk set indicated by the position information of the disk slice 331 and the disk slice 341 is identical to the target disk set (the disk set 301). If not, the process 400 proceeds to 411.

At 411, data in at least one disk slice may be moved to the target disk set. For example, since the disk slice 341 is located in the disk set 302, as indicated by the position information thereof, rather than in the target disk set, the data in the disk slice 341 are moved to the disk set 301. By comparing the respective disk set where the respective disk slice is located with the target disk set, disk slices of the same storage unit across disk sets can be determined efficiently.

In some embodiments, the data in the at least one disk slice may be moved to the target disk set through the following operation. For example, one target storage disk (e.g., storage disk 320) may be selected from the target disk set. The principle of selecting a target storage disk lies in that the target storage disk is different from respective storage disks in which the plurality of disk slices are located. For example, the target storage disk may not be the storage disk 330 in which the disk slice 331 corresponding to the storage unit (PU) is located, nor may it be the storage disk 340 in which the storage disk 341 corresponding to the storage unit PU is located. As such, at least one disk slice may be selected from the target storage disk, to store the moved data.

Figure 5:
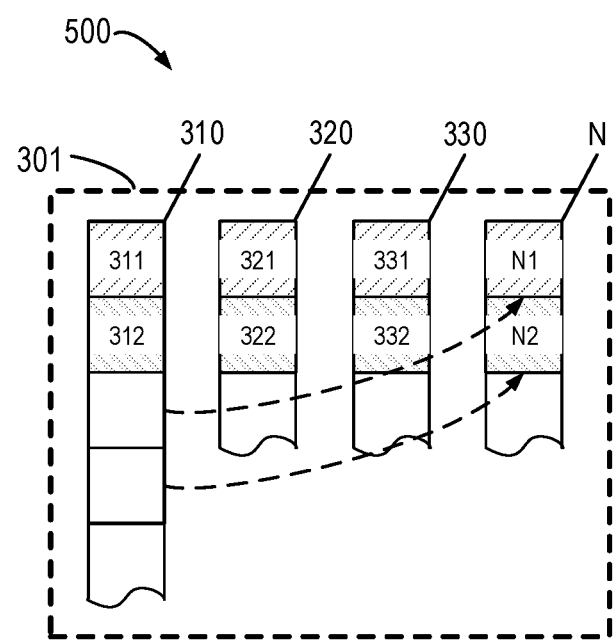
FIG. 5 illustrates a schematic diagram of an application scenario for data movement according to embodiments of the present disclosure.

In order to optimize the performance of the solution of the present disclosure, embodiments of the present disclosure will be described below with reference to FIG. 5. FIG. 5 illustrates a schematic diagram of an application scenario 500 for data movement according to embodiments of the present disclosure.

Likewise in FIG. 3, the storage disks 310, 320, 330 and N in FIG. 5 are all used for data storage. Moreover, as shown in FIG. 5, the storage disk 310 may at least include disk slices 311 and 312, the storage disk 320 may at least include storage disks 321 and 322, and the storage disk 330 may at least include storage disks 331 and 332. A difference from FIG. 1 is that the disk set 301 in FIG. 3 is a target disk set after the data movement process, as described above. The disk set 301 further includes therein a new added storage disk N. For example, the storage disk N does not store any data initially. In the premise of ensuring that the storage unit (PU) is not arranged across different disk sets, the original disk slices 313 and 314 in the storage disk 310 may be moved to positions of disks slices N1 and N2 in the storage disk N, in order to balance respective storage disks in the disk set 301.

Figure 6:
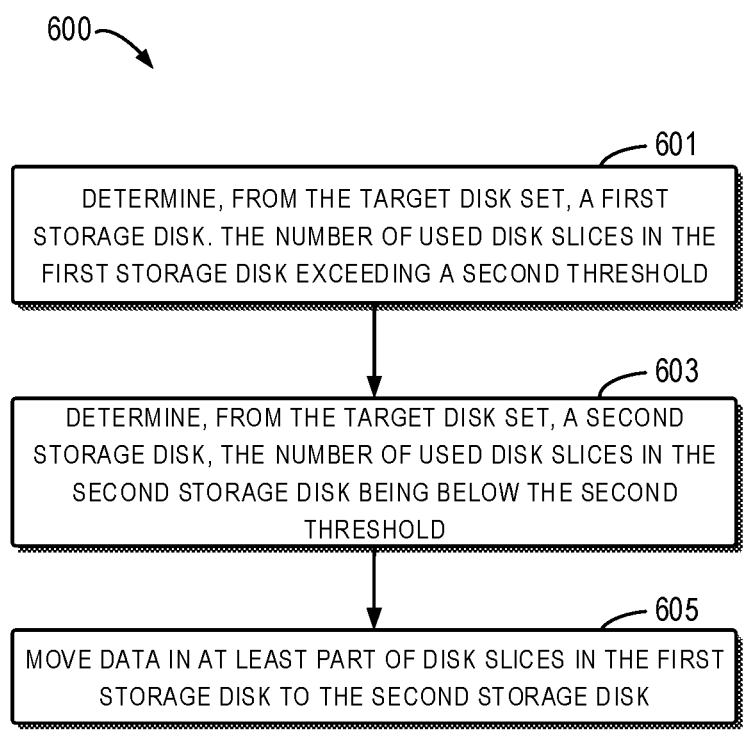
FIG. 6 illustrates a flowchart of a process of data movement according to embodiments of the present disclosure.

Preferred embodiments for managing the storage disk 310, the storage disk 320, the storage disk 330 and the storage disk N have been described above with reference to FIG. 5. The examples are provided merely for illustrating the present disclosure, rather than limiting the present disclosure. Reference will now be made to FIG. 6 to describe a flowchart of a process of data movement.

Figure 7:
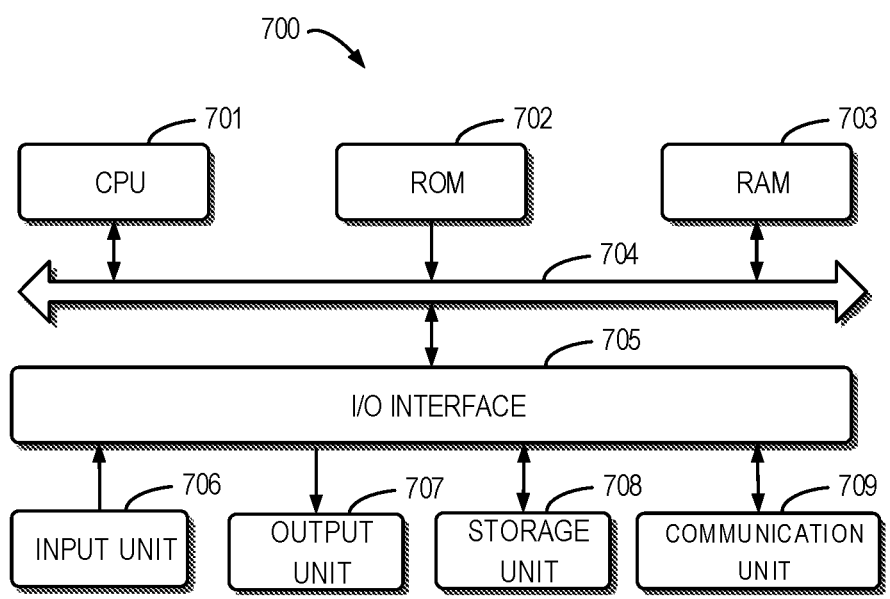
FIG. 7 illustrates a schematic block diagram of an example device appropriate for implementing embodiments of the present disclosure.

FIG. 6 illustrates a flowchart of a process 600 of data movement according to embodiments of the present disclosure. In some embodiments, the process 600 may be implemented in a device as shown in FIG. 7. For example, the process 600 may be implemented in the application scenario 500 for managing the storage disk 310, the storage disk 320, the storage disk 330 and the storage disk N. Reference will now be made to FIG. 5 to describe the process 600 of storage management according to embodiments of the present disclosure. For ease of understanding, specific data as will be mentioned in the following description are all provided by way of example, rather than suggesting any limitation to the protection scope of the present disclosure.

At 601, a first storage disk may be determined from the target disk set, and the number of used disk slices in the first storage disk exceeds a threshold. For example, the threshold may be determined as an average (e.g., 2) of the numbers of used disk slices in the respective storage disks, and it then can be determined that the number (e.g., 4) of the disk slices of the storage disk 310 in the disk set 301 exceeds the threshold.

At 603, the second storage disk may be determined from the target disk set, and the number of used disk slices in the second storage disk is below the threshold. For example, given this threshold (e.g., 2), it can be determined that the number (e.g., 0) of the disks slices of the storage disk N in the disk set 301 is below the threshold.

At 605, data in at least some disk slices in the first storage disk may be moved to the second storage disk. As shown in FIG. 5, the original disk slices 313 and 314 in the storage disk 310 may be moved to the present disk slices N1 and N2 in the storage disk N. In other words, the data in the disk slices 313 and 314 may be moved to the disk slices N1 and N2. In this way, a balance can be achieved among the storage disks 310, 320, 330 and N.

Alternatively or additionally, disk slices may also be moved through the following process. For example, a first storage disk may be determined from the target disk set, which has a utilization rate exceeding a first threshold. Subsequently, a second storage disk may be determined from the storage disk set, which has a utilization rate below the first threshold. Finally, the data in at least some disk slices in the first storage disk may be moved to the second storage disk.

In this way, the storage system 100 may move, in units of disk slices, data in a storage disk with a utilization rate, for example, greater than an average utilization rate, to a storage disk with a utilization rate less than the average utilization rate, to make the utilization rates of a plurality of storage disks more even.

In the current storage unit-based system, every 12 storage units correspond to one virtual storage unit (Virtual Uber) while one or more virtual storage units correspond to one virtual container (Virtual Container). For each virtual container, disk slices of each storage unit corresponding thereto should be located in the same disk set, and a plurality of storage units corresponding thereto should be arranged evenly on a plurality of storage disks of a disk set. While for a plurality of virtual containers, disk slices of each virtual container located on each storage disk and in the whole disk set should be as uniform as possible.

By implementing the above embodiments, the present disclosure can prevent a storage unit from being arranged across different disk sets and thus improve the stability of the storage system. In addition, given that a threshold is determined, data of a disk slice in the disk exceeding the threshold can be moved to a disk slice in the disk not reaching the threshold, thereby making the utilization rates of a plurality of storage disks more uniform.

FIG. 7 illustrates a schematic block diagram of an example device 700 that can be used to implement embodiments of the present disclosure. As shown, the device 700 includes a central processing unit (CPU) 701 which performs various appropriate acts and processing, based on computer program instructions stored in a read-only memory (ROM) 702 or computer program instructions loaded from a storage unit 708 to a random access memory (RAM) 703. The RAM 703 stores therein various programs and data required for operations of the device 700. The CPU 701, the ROM 702 and the RAM 703 are connected via a bus 704 with one another. An input/output (I/O) interface 705 is also connected to the bus 704.

The following components in the device 700 are connected to the I/O interface 705: an input unit 706 such as a keyboard, a mouse and the like; an output unit 707 including various kinds of displays and a loudspeaker, etc.; a storage unit 708 including a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the process 400 and/or 600 may be executed by the processing unit 701. For example, in some embodiments, the process 400 and/or 600 may be implemented as a computer software program that is tangibly included in a machine-readable medium, e.g., the storage unit 708. In some embodiments, part or all of the computer programs may be loaded and/or mounted onto the device 700 via the ROM 702 and/or communication unit 709. When the computer programs are loaded to the RAM 703 and executed by the CPU 701, one or more steps of the process 400 and/or 600 as described above may be executed.

The present disclosure may be a method, a device, a system, and/or a computer program product. The computer program product may include a computer-readable storage medium with computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, an electronic circuitry including, for example, a programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the functions/acts specified in the flowchart and/or block diagram block or blocks.

The computer-readable program instructions may also be loaded onto a computer, other programmable data processing devices, or other devices to cause a series of operational steps to be performed on the computer, other programmable devices or other device to produce a computer implemented process, such that the instructions which are executed on the computer, other programmable devices, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, a snippet, or a portion of code, which includes one or more executable instructions for implementing the specified logical function(s). In some alternative embodiments, the functions noted in the block may occur out of the order noted in the figures. For example, two blocks in succession may, in fact, be executed substantially concurrently, or the blocks may sometimes be executed in a reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of storage management, comprising:
   in accordance with a determination that an original disk set comprising a plurality of storage disks is changed, determining a plurality of updated disk sets;
   determining, from the plurality of updated disk sets, a target disk set for a storage unit associated with the plurality of storage disks;
   determining position information of a plurality of disk slices corresponding to the storage unit in the plurality of storage disks, the position information indicating respective updated disk sets in which the plurality of disk slices are located; and
   in accordance with a determination that an updated disk set indicated by the position information of at least one of the plurality of disk slices is different from the target disk set, moving data in the at least one disk slice to the target disk set.

2. The method of claim 1, wherein determining the plurality of updated disk sets comprises:
in accordance with a determination that a number of storage disks in the original disk set exceeds a predetermined number of disks for the original disk set, determining the plurality of updated disk sets from the original disk set.

3. The method of claim 1, wherein determining the target disk set of the storage units comprises:
determining a group of storage units associated with the storage unit; and
in accordance with a determination that a number of storage units in the group located within one of the plurality of updated disk sets exceeds a predetermined threshold, determining the updated disk set as the target disk set.

4. The method of claim 1, wherein determining the position information of the plurality of disk slices comprises:
determining respective storage disks in which respective ones of the plurality of disk slices are located; and
determining the position information based on information related to updated disk sets comprising the determined storage disks.

5. The method of claim 1, wherein moving the data in the at least one disk slice to the target disk set comprises:
selecting a target storage disk from the target disk set, the target storage disk being different from respective storage disks in which the plurality of disk slices are located; and
selecting at least one disk slice from the target storage disk to store the data.

6. The method of claim 1, further comprising:
determining, from the target disk set, a first storage disk with a utilization rate exceeding a first threshold;
determining, from the target disk set, a second storage disk with a utilization rate being below the first threshold; and
moving data in at least some disk slices in the first storage disk to the second storage disk.

7. The method of claim 1, further comprising:
determining, from the target disk set, a first storage disk with a number of used disk slices exceeding a second threshold;
determining, from the target disk set, a second storage disk with the number of used disk slices being below the second threshold; and
moving data in at least some disk slices in the first storage disk to the second storage disk.

8. An electronic device, comprising:
a processor; and
a memory storing computer program instructions, the processor executing the computer program instructions in the memory to control the electronic device to perform acts comprising:
in accordance with a determination that an original disk set comprising a plurality of storage disks is changed, determining a plurality of updated disk sets;
determining, from the plurality of updated disk sets, a target disk set for a storage unit associated with the plurality of storage disks;
determining position information of a plurality of disk slices corresponding to the storage unit in the plurality of storage disks, the position information indicating respective updated disk sets in which the plurality of disk slices are located; and
in accordance with a determination that an updated disk set indicated by position information of at least one of the plurality of disk slices is different from the target disk set, moving data in the at least one disk slice to the target disk set.

9. The electronic device of claim 8, wherein determining the plurality of updated disk sets comprises:
in accordance with a determination that a number of storage disks in the original disk set exceeds a predetermined number of disks for the original disk set, determining the plurality of updated disk sets from the original disk set.

10. The electronic device of claim 8, wherein determining the target disk set of the storage units comprises:
determining a group of storage units associated with the storage unit; and
in accordance with a determination that a number of storage units in the group located within one of the plurality of updated disk sets exceeds a predetermined threshold, determining the updated disk set as the target disk set.

11. The electronic device of claim 8, wherein determining the position information of the plurality of disk slices comprises:
determining respective storage disks in which respective ones of the plurality of disk slices are located; and
determining the position information based on information related to updated disk sets comprising the determined storage disks.

12. The electronic device of claim 8, wherein moving the data in the at least one disk slice to the target disk set comprises:
selecting a target storage disk from the target disk set, the target storage disk being different from respective storage disks in which the plurality of disk slices are located; and
selecting at least one disk slice from the target storage disk to store the data.

13. The electronic device of claim 8, wherein the acts further comprise:
determining, from the target disk set, a first storage disk with a utilization rate exceeding a first threshold;
determining, from the target disk set, a second storage disk with a utilization rate being below the first threshold; and
moving data in at least some disk slices in the first storage disk to the second storage disk.

14. The electronic device of claim 8, wherein the acts further comprise:
determining, from the target disk set, a first storage disk with the number of used disk slices exceeding a second threshold;
determining, from the target disk set, a second storage disk with the number of used disk slices being below the second threshold; and
moving data in at least some disk slices in the first storage disk to the second storage disk.

15. A computer program product having a non-transitory computer readable medium which stores a set of instructions to perform storage management; the set of instructions, when carried out by computerized circuitry, causing the computerized circuitry to perform a method of:
in accordance with a determination that an original disk set comprising a plurality of storage disks is changed, determining a plurality of updated disk sets;

determining, from the plurality of updated disk sets, a target disk set for a storage unit associated with the plurality of storage disks;

determining position information of a plurality of disk slices corresponding to the storage unit in the plurality of storage disks, the position information indicating respective updated disk sets in which the plurality of disk slices are located; and in accordance with a determination that an updated disk set indicated by the position information of at least one of the plurality of disk slices is different from the target disk set, moving data in the at least one disk slice to the target disk set.

* * * * *